March 30, 1937.  E. N. KERSEY  2,075,730

SUPPORT AND LIFTING ATTACHMENT FOR WHEELS

Filed July 22, 1935  2 Sheets-Sheet 1

Earl N. Kersey, INVENTOR

BY Victor J. Evans & Co. ATTORNEY

March 30, 1937.  E. N. KERSEY  2,075,730
SUPPORT AND LIFTING ATTACHMENT FOR WHEELS
Filed July 22, 1935  2 Sheets-Sheet 2
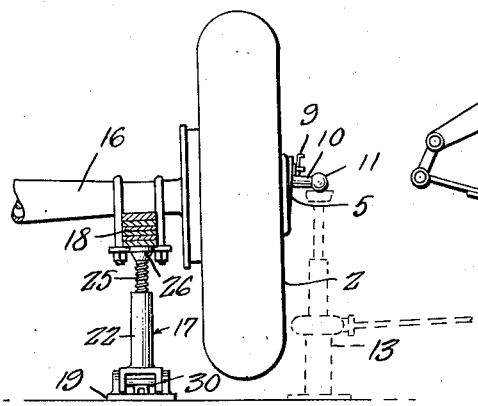
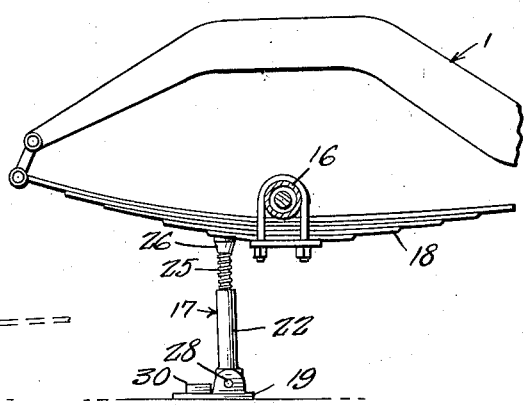
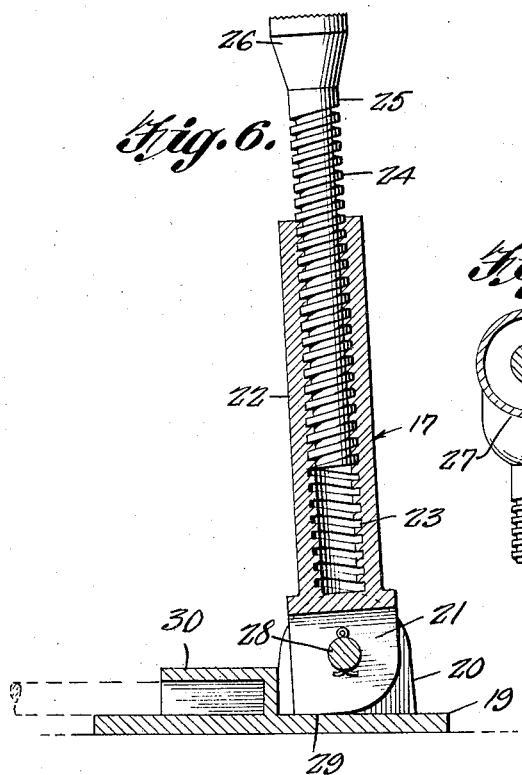
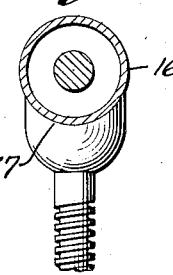
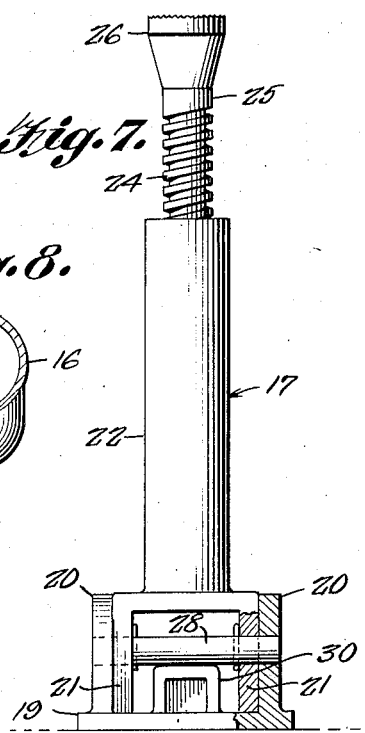
Earl N. Kersey,
INVENTOR Patented Mar. 30, 1937

2,075,730

UNITED STATES PATENT OFFICE 2,075,730

SUPPORT AND LIFTING ATTACHMENT FOR WHEELS

Earl N. Kersey, Tampico, Tamps, Mexico

Application July 22, 1935, Serial No. 32,647

2 Claims. (Cl. 254—133)

This invention relates to lifting devices and supports adapted for jacking up the wheels of automobiles and especially automobiles of recent design wherein the axles are so located and the body so shaped or designed as to render the placing of an ordinary jack under the axle difficult without the person kneeling or lying on the ground and thereby soiling the clothes. The present invention has for the primary object the provision of means which may be readily adapted to a wheel hub after the removal of the dust cap therefrom, to be engaged by a jacking means located outwardly of the wheel whereby the latter may be raised or elevated to a desired height from the ground, permitting an adjustable support forming a part of my invention to be applied to the vehicle spring adjacent said wheel for maintaining the wheel elevated while the jacking means is removed to allow the removal of the wheel or its tire without interference by said means.

Another object of this invention is the provision of means to said support which will permit the vehicle to be readily moved off of the support after the replacement of the wheel without lowering or adjusting said support.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 4 is a fragmentary sectional view showing the wheel supported in an elevated position by a support forming a part of my invention and being applied to the vehicle spring adjacent to the wheel so that the jacking means may be removed.

Figure 5 is a fragmentary sectional view showing the supporting means applied to the vehicle spring.

Figure 6 is a vertical sectional view illustrating the supporting means.

Figure 7 is an end elevation illustrating the same.

Figure 8 is a fragmentary sectional view showing the modified form of head for the support to permit the adapting of the support to a motor vehicle axle housing.

Figure 1:
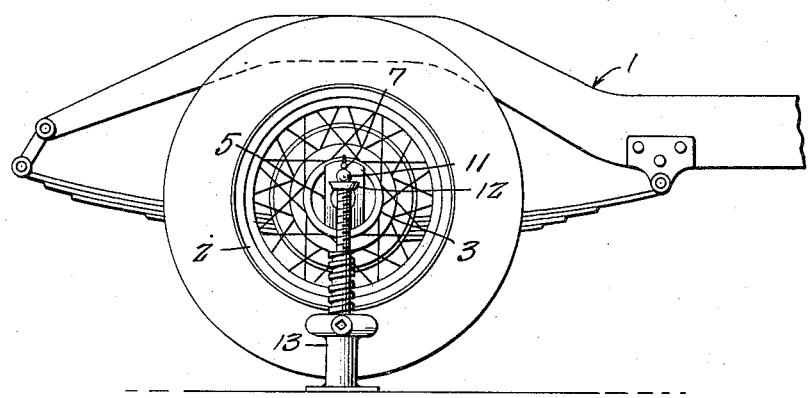
Figure 1 is a fragmentary side elevation showing a motor vehicle chassis with one of the wheels thereof jacked up by my invention being adapted to the hub of the wheel.
Figure 2:
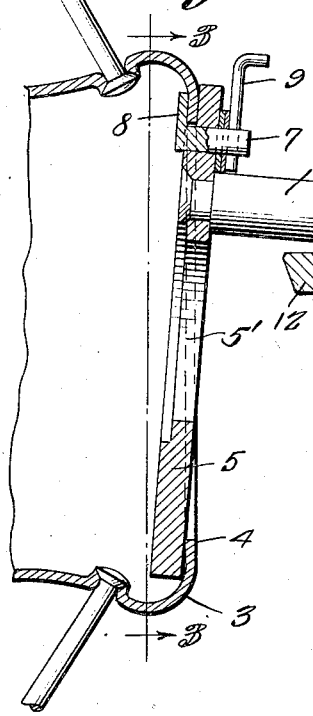
Figure 2 is a fragmentary sectional view showing the application of the jacking means of my invention to the hub of the wheel.
Figure 3:
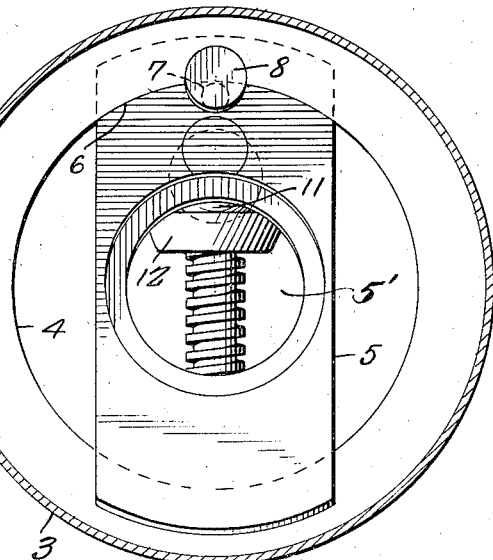
Figure 3 is a sectional view taken on the line 3—3 of Figure 2.

Referring in detail to the drawings, the numeral 1 indicates a fragmentary portion of a motor vehicle chassis wherein the motor vehicle wheel 2 is of the late or modern type having a hub 3 closed by a removable dust cap (not shown). The hub 3 has a flange 4 to be engaged by the dust cap. To simplify the jacking up or elevating of a wheel of this character, a plate 5 is provided which, at its lower end, is positioned inwardly of the flange 4 of the hub 3 and the outer end is disposed outwardly of said flange. Adjacent the upper end of the plate is a groove or seat 6 to engage with the flange 4. A shaft 7 is journaled to the plate adjacent to said seat 6 and carries an eccentric 8 adapted to be turned into engagement with the inner face of the flange by the rotation of the shaft. A finger piece 9 is secured to the shaft 7 to facilitate the engagement and disengagement of the eccentric with the flange of the hub.

Secured to and projecting outwardly from the plate 5 is an arm 10 carrying at its free end a ball or sphere 11 to engage with the head 12 of a jack 13. The head 12 is recessed, as shown at 14, in which seats the ball 11. The arm 10 is disposed above the axle 16 of the wheel and preferably in substantial vertical alignment therewith. The jack 13 is preferably of the screw type and when actuated it will elevate the wheel to a desired distance from the ground. It will be seen that the operation of the jack 13 can be easily carried out due to its location with respect to the vehicle and that the ball 11 of the arm 10 will readily adjust itself to the head 12 of the jack during the elevation of the wheel.

After the elevation of the wheel from the ground, as shown in Figure 1, by the jack 13, an adjustable support 17 is placed under the vehicle spring 18, as shown in Figure 5. The jack 13 may then be removed, leaving the wheel in an elevated position so that said wheel can be readily removed or the tire thereof removed.

The support 17 includes a base 19 having formed thereon upstanding ears 20 to which are pivoted ears 21 of a sleeve or cylinder 22. Feed threads 23 are formed in the cylinder or sleeve to mesh with feed threads 24 of a stem 25, the latter carrying at its free end a head 26. The head 26 may be provided with a knurled flat face or a concaved seat 27, as shown in Figure 8. The flat face is preferable when using the support in conjunction with the vehicle spring. However, when desiring to adapt the support to an axle housing or an axle, it is preferable to employ the form of head shown in Figure 8. The ears 21 are pivoted to the ears 20 by a pin 28. The ears 21 are shaped to form heel portions 29 adapted to contact the base 19 for supporting the sleeve and its stem slightly beyond dead center to obviate the sleeve and stem from pivoting when supporting a vehicle. However, when sufficient force is applied to the vehicle or automobile in the proper direction, the sleeve and its stem will swing on its pivot and allow said automobile to gravitate to the ground. A socketed member 30 is formed on the base to receive a jack handle to facilitate the placing of the support 17 under the vehicle. It is to be understood that the stem 25 is adjusted relative to the sleeve 22 to position the head 26 at a proper height from the ground to fit under the vehicle or automobile prior to placing the support under the vehicle so that when the jack 13 is lowered and removed the vehicle will remain elevated by being supported by said support.

My invention will facilitate the jacking up of any one of the wheels of a motor vehicle and especially will permit the elevating of the front wheels of a motor vehicle equipped with knee action. The arm 10 being disposed in a plane above the axle of the vehicle and in substantial vertical alignment therewith will when engaged by the jack more efficiently center the load on the jack and materially obviate the danger of the arm 10 or the ball 11 thereof slipping off of the jack during the raising of the vehicle.

The plate 5 has formed therein an opening 5' so that said plate may readily fit over a hub of a wheel with the walls of the opening contacting the hub and thereby secure the plate to the hub. The opening 5' permits the plate to be adapted to motor vehicle wheels wherein the hub is of a small diameter and of a type frequently employed in wooden wheel construction.

Having described the invention, I claim:

1. In combination with a motor vehicle wheel having a hub provided with a flange, a plate positioned to have one end thereof engageable with the flange and inwardly of the hub with the opposite end of said plate engaging said flange outwardly of the hub, means detachably securing said plate to the hub, and means carried by said plate to engage with a jack outwardly of the hub.

2. In combination with a motor vehicle wheel having a hub provided with a flange, a plate positioned to have one end thereof engageable with the flange and inwardly of the hub with the opposite end of said plate engaging said flange outwardly of the hub, a shaft journaled on the plate, an eccentric secured to said shaft and adapted to be turned to engage with the flange for locking the plate to the hub, a finger piece secured to said shaft, and means carried by said plate to engage with a jack.

EARL N. KERSEY.